United States Patent
Song et al.

(10) Patent No.: US 9,542,458 B2
(45) Date of Patent: Jan. 10, 2017

(54) SYSTEMS AND METHODS FOR PROCESSING AND DISPLAYING USER-GENERATED CONTENT

(71) Applicant: AOL Inc., Dulles, VA (US)

(72) Inventors: Sang Chul Song, Aldie, VA (US); Sudhir Achuthan, Vienna, VA (US); Thu Kyaw, Reston, VA (US); Sean Christopher Timm, Herndon, VA (US); Aaron T. Soules, Hadley, MA (US); Vineet Mahajan, Ashburn, VA (US)

(73) Assignee: AOL Inc., Dulles, VA (US)

( * ) Notice: Subject to any disclaimer, the term of this patent is extended or adjusted under 35 U.S.C. 154(b) by 252 days.

(21) Appl. No.: 14/155,199

(22) Filed: Jan. 14, 2014

(65) Prior Publication Data

US 2014/0201201 A1    Jul. 17, 2014

Related U.S. Application Data

(60) Provisional application No. 61/752,867, filed on Jan. 15, 2013.

(51) Int. Cl.
    *G06F 17/30* (2006.01)
(52) U.S. Cl.
    CPC ... *G06F 17/30554* (2013.01); *G06F 17/30905* (2013.01)
(58) Field of Classification Search
    CPC ............ G06F 17/3053; G06F 17/30554; G06F 17/30601; G06F 17/30696; G06F 17/30705
    USPC ......................................... 707/723, 734, 749
    See application file for complete search history.

(56) References Cited

U.S. PATENT DOCUMENTS

| | | | | |
|---|---|---|---|---|
| 8,214,446 B1* | 7/2012 | Siegel | ..................... | G06F 21/31 705/5 |
| 2008/0177704 A1* | 7/2008 | Denney | ............ | G06F 17/30864 |
| 2011/0191406 A1* | 8/2011 | Plunkett | .................. | G06F 15/16 709/203 |
| 2011/0320373 A1* | 12/2011 | Lee | ........................ | G06Q 50/01 705/319 |
| 2012/0144311 A1* | 6/2012 | Yeh | ........................ | G06Q 10/10 715/744 |
| 2013/0117261 A1* | 5/2013 | Sambrani | .......... | G06F 17/30867 707/734 |

OTHER PUBLICATIONS

International Preliminary Report on Patentability mailed Jul. 30, 2015 in corresponding International PCT Application No. PCT/US2014/011532, filed Jan. 14, 2014 (7 pages).
International Search Report and Written Opinion issued in corresponding International Application No. PCT/US2014/011532, mailed Aug. 7, 2014.

\* cited by examiner

*Primary Examiner* — Debbie Le
(74) *Attorney, Agent, or Firm* — Bookoff McAndrews, PLLC

(57) ABSTRACT

Systems and methods are provided for processing and displaying user-generated content. User-generated content is received from a user over a network. A conversation related to the received user-generated content is identified. A score associated with the identified conversation is calculated based on one or more parameters related to the user or the conversation. The user-generated content is provided for display in relation to the conversation, based on the calculated score associated with the conversation.

19 Claims, 7 Drawing Sheets

SHARE TO YOUR SOCIAL NETWORKS
☐🔗 ☐ f ☐ 8+                  250  [PREVIEW]  [SUBMIT]

COMMUNITY PUNDITS                                    1/6 ◁ ▷

USER1 ♡                                            💬1  ☆1
POLITICAL PUNDIT - 2,643 FANS - "I'M TAKING ON STUPID
                                    WHEREVER IT EXISTS"
OTHER THAN THE LAW REQUIRING 7 BULLETS RATHER THAN 10,
NEW YORK'S LAW WOULD BE, IF PASSED, NO DIFFERENT THAN
THE LAWS THAT EXISTED IN CT AT THE TIME OF THE SANDY HOOK
SHOOTING. THE 1994 ASSAULT WEAPON'S BAN WAS EFFECT AND
HAS BEEN IN CT SINCE. ONCE AGAIN NY HAS TO MAKE THE
HEADLINES - BE THE CENTER OF ATTENTION... ...READ
14 MINUTES AGO   FLAG   DEMOTE

2 COMMENTS BY 2 PEOPLE

[↪ REPLY]  [☆ FAVE]  [◁ SHARE]  [READ CONVERSATION →]

MOST RECENT    HIGHLIGHTED    MOST FAVED    MY CONVERSATIONS

USER2 ♡
5,374 - DON'T PANIC              FEATURED COMMENTS SECTION

THERE WAS A MASSACRE IN AUSTRALIA ALSO IN A PLACE CALLED
NEW TOWN, THE COUNTRY ENACTED STRICT GUN CONTROL......

↪ REPLY  ☆ FAVE  ◁ SHARE  ◁ PROMOTE  A MINUTE AGO  FLAG

USER3 ♡                                                    ☆1
1,812 FANS - JUST A TALL, SKINNY HUNGARIAN GIRL

Q: WHAT IS THE BEST WEAPON AGAINST A BAD GOVERNMENT?
A: EDUCATION.

↪ REPLY  ☆ FAVE  ◁ SHARE  ◁ PROMOTE  A MINUTE AGO  FLAG

*FIG. 4*

SORTED BY NOTEWORTHY SCORE

MOST RECENT   (HIGHLIGHTED)   MOST FAVED   MY CONVERSATIONS

USER4 ♡                                           💬 26 ☆ 37
SUPER USER - 163 FANS - MY MACRO-B IO IS EMPTY TOO...

I EAGERLY AWAIT THE GNASHING OF TEETH AND RENDING OF GARMENTS
ACCOMPANYING THE CLAIMS OF INABILITY TO DEFEND ONE'S HOME.....

↪REPLY  ☆FAVE  ◁SHARE  ◁PROMOTE   5 HOURS AGO   FLAG

USER5 ♡                                                    ☆ 14
13 FANS

HOW ABOUT IT IS NO LONGER POSSIBLE TO DEFEND ONE'S HOME
WITH THE MAJORITY OF COMMONLY SELECTED HANDGUNS
BECAUSE 7 ROUND MAGAZINES DO NOT EXIST FOR THOSE WEAPONS?

↪REPLY  ☆FAVE  ◁SHARE   5 HOURS AGO   FLAG

USER6 ♡                                                     ☆ 5
19 FANS

DID YOU HEAR ABOUT THE EX MARINE IN ARIZONA THAT WAS ACTUALLY
INVADED BY THE SWAT TEAM, AND I BELIVE WAS SHOT ABOUT 60 TIMES?
......READ

↪REPLY  ☆FAVE  ◁SHARE   5 HOURS AGO   FLAG

27 COMMENTS BY 7 PEOPLE   [READ CONVERSATION →]

USER7 ♡                                           💬 36 ☆ 22
5 FANS

WHY TAKE AWAY OUR CONSTITUTIONAL RIGHT TO DEFEND OURSELVES
WITH A WEAPON? FIRST OF ALL, TAKING AWAY WEAPONS IS NOT GOING
TO HELP GET WEAPONS OFF THE STREET. WEED IS ILLEGAL BUT WHEN
I WAS 15, I WAS ABLE TO OBTAIN MARIJUANA. PEOPLE WILL STILL FIND
A WAY TO......READ MORE

↪REPLY  ☆FAVE  ◁SHARE  ◁PROMOTE   4 HOURS AGO   FLAG

USER8 ♡                                                     ☆ 8
SUPER USER - 827 FANS - I WISH CONSERVATIVES WOULD READ ....

*FIG. 5*

SYSTEMS AND METHODS FOR PROCESSING AND DISPLAYING USER-GENERATED CONTENT

RELATED APPLICATIONS

This application claims the benefit of priority from U.S. Provisional Patent Application No. 61/752,867, filed Jan. 15, 2013, which is herein incorporated by reference in its entirety.

TECHNICAL FIELD

Various embodiments of the present disclosure relate generally to processing electronic messages, such as over the Internet. More specifically, particular embodiments of the present disclosure relate to systems and methods for processing and displaying user-generated content, such as comments submitted over the Internet.

BACKGROUND

Typically, online publishers, such as online media companies and other publishers of articles, stories, and other electronic content, provide online web page space and mechanisms for viewers to comment on, or otherwise interact with, that published content.

Some articles attract many comments, including sometimes too many for one person to browse through all of those comments. In addition, some comments form a conversation, replying to one another, and some conversations are worth noting, and actually helping to invite more user interactions. The prevalent way to present comments is in order of recency (more recent comments on the top), sometimes causing other interesting/insightful comments to disappear. Because of how comments are typically displayed in sequential order and in un-nested conversations, it can be difficult for readers to identify important or interesting comments or conversations. For example, an important person such as the author or a pundit may comment on an article, and that comment may spur many additional comments, including comments by popular, demographically-significant, or otherwise important people. Due to the standard sequencing of comments, those comments or conversations may be too far down a chain of comments to appear within a reasonable distance from the original content.

SUMMARY OF THE DISCLOSURE

Embodiments disclose systems and methods for processing and displaying user-generated content.

According to certain embodiments, computer-implemented methods are disclosed for processing and displaying user-generated content. In an exemplary method, user-generated content is received from a user over a network. A conversation related to the received user-generated content is identified. A score associated with the identified conversation is calculated based on one or more parameters related to the user or the conversation. The user-generated content is provided for display in relation to the conversation, based on the calculated score associated with the conversation.

According to certain embodiments, systems are disclosed for processing and displaying user-generated content. One system includes a memory having processor-readable instructions stored therein; and a processor configured to access the memory and execute the processor-readable instructions, which when executed by the processor configures the processor to perform a plurality of functions, including functions to: receive, from a user over a network, user-generated content; identify a conversation related to the received user-generated content; calculate a score associated with the identified conversation, based on one or more parameters related to the user or the conversation; and provide the user-generated content for display in relation to the conversation, based on the calculated score associated with the conversation.

According to certain embodiments, a computer readable medium is disclosed as storing instructions that, when executed by a computer, cause the computer to perform functions to: receive, from a user over a network, user-generated content; identify a conversation related to the received user-generated content; calculate a score associated with the identified conversation, based on one or more parameters related to the user or the conversation; and provide the user-generated content for display in relation to the conversation, based on the calculated score associated with the conversation.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 illustrates an exemplary graphical user interface (GUI) for processing and displaying user-generated content, according to an embodiment of the present disclosure.

FIG. 5 illustrates another exemplary GUI for processing and displaying user-generated content, according to an embodiment of the present disclosure.

DESCRIPTION OF THE EMBODIMENTS

Figure 1:
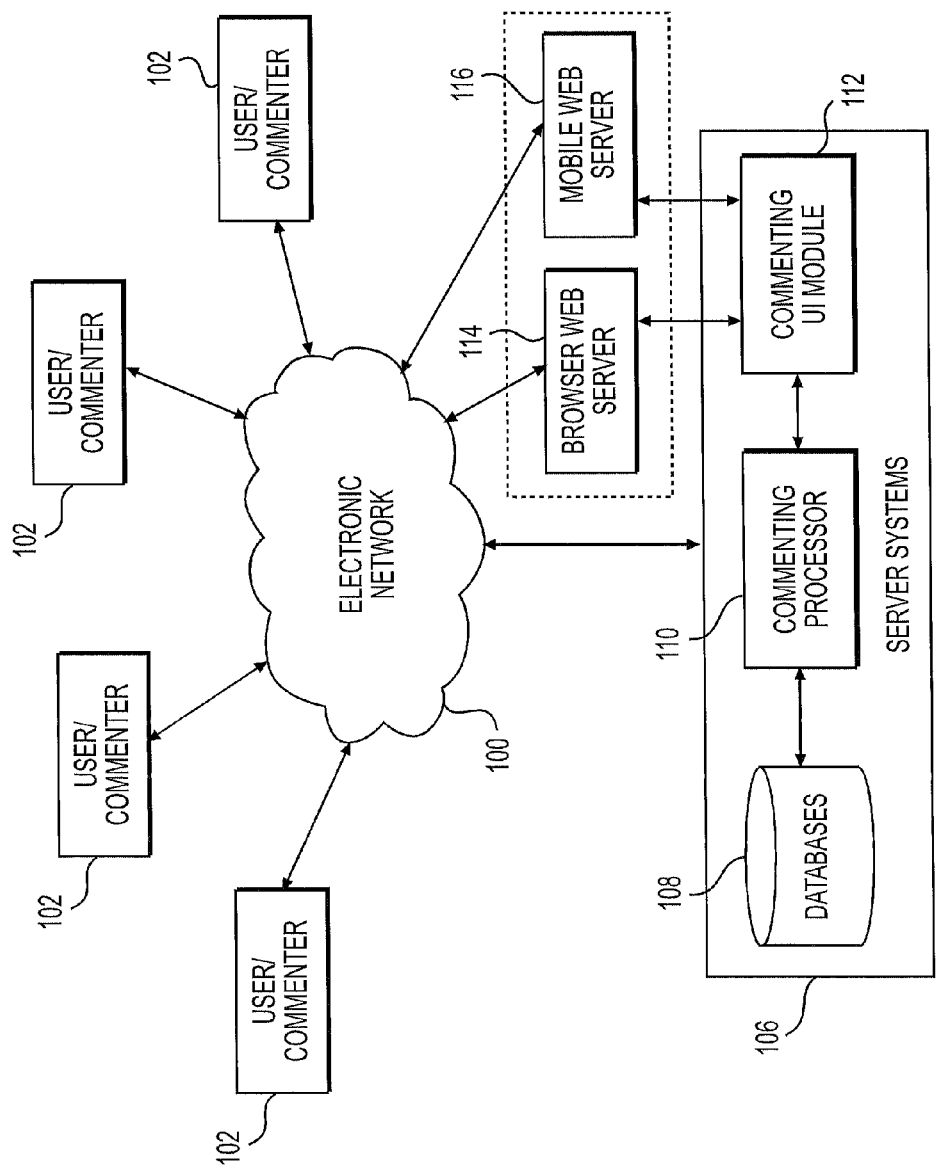
FIG. 1 is a schematic diagram of a network environment for processing and displaying user-generated content, according to an embodiment of the present disclosure.

While the present disclosure is described herein with reference to illustrative embodiments for particular applications, it should be understood that embodiments of the present disclosure are not limited thereto. Other embodiments are possible, and modifications can be made to the described embodiments within the spirit and scope of the teachings herein, as they may be applied to the above-noted field of the present disclosure or to any additional fields in which such embodiments would be of significant utility.

In view of the challenges associated with the conventional techniques outlined above, systems and methods are disclosed herein for processing and displaying user-generated content. In one example, such user-generated content may include comments or messages submitted by different users to a message stream, e.g., as part of an online message board or forum provided via a web page accessible over the Internet. The different users in this example may be participants of one or more virtual conversations or message threads including a series of comments posted by different users/participants at various times to the online message board or forum. The conversation may be associated with an article or a blog entry displayed on the web page. Accordingly, each user may post or submit comments for a particular topic of interest that relates to the subject matter of the article or blog entry in this example. The comments may be submitted by each user via an interface provided on a web page that is loaded within a web browser executable at the user's computing device. Also, the comments may be in the form of electronic messages including, for example, text, graphics (e.g., icons or "emoticons"), and/or other types of content (e.g., embedded audio or video content). Further, the message board for the article or blog entry may include multiple conversations on various topics of interest between different users.

In an embodiment, the conversations displayed as part of an online message board or forum may be sorted based on a score calculated for each conversation. As will be described in further detail below, the score calculated for a conversation may be based on one or more parameters associated with the conversation or the individual participants of the conversation. Examples of such parameters include, but are not limited to, a demographic of each user or participant, an activity level of the conversation, and a number of participants in the conversation.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a schematic diagram of an exemplary network environment in which electronic messages and other user-generated content may be processed and displayed, according to an embodiment of the present disclosure. As shown in FIG. 1, the environment may include a plurality of user or commenter devices 102 that are communicatively coupled to each other as well as a plurality of server systems 106, a browser web server 114, and/or a mobile web server 116 via an electronic network 100. Electronic network 100 may include one or a combination of wired and/or wireless electronic networks. Network 100 may also include a local area network, a medium area network, or a wide area network, such as the Internet.

In one embodiment, each of user or commenter devices 102 may be any type of computing device configured to send and receive different types of content and data to and from various computing devices via network 100. Examples of such a computing device include, but are not limited to, a desktop computer or workstation, a laptop computer, a mobile handset, a personal digital assistant (PDA), a cellular telephone, a network appliance, a camera, a smart phone, an enhanced general packet radio service (EGPRS) mobile phone, a media player, a navigation device, a game console, a set-top box, or any combination of these or other types of computing devices having at least one processor, a local memory, a display (e.g., a monitor or touchscreen display), one or more user input devices, and a network communication interface. The user input device(s) may include any type or combination of input/output devices, such as a keyboard, touchpad, mouse, touchscreen, camera, and/or microphone.

In one embodiment, each of the user or commenter devices 102 may be configured to execute a web browser or mobile browser installed for displaying various types of content and data received from any of server systems 106 and/or web servers 114 and 116 via network 100. Server systems 106 in turn may be configured to receive user-generated content, e.g., in the form of comments, from user or commenter devices 102 over electronic network 100. The comments may be submitted by a user at each device 102 through an interface provided on a web page loaded within the browser executable at each device.

While browser web server 114 and mobile web server 116 are shown separately in FIG. 1, it should be noted that web servers 114 and 116 may be implemented using a single server device or system. In an example, such a single server may be a web server that is configured to provide different versions of a web page and associated content to each of user/commenter devices 102 according to the type of device or web browser executable at the device. The different versions of the web page may include, for example, a desktop version and a mobile version, for which the web page content may be formatted appropriately for display via the particular type of browser at the device. Further, any of the devices or functionality of server systems 106, browser web server 114, and/or a mobile web server 116 may be combined together or separated, and may be operated by a single administrative entity, or outsourced to one or more other entities, such as a web hosting entity, web storage entity, and/or cloud computing service, possibly disposed remotely of each other.

As shown in the example of FIG. 1, server systems 106 may include a commenting processor 110. In an embodiment, commenting processor 110 may be configured to analyze and execute a scoring algorithm in order to calculate or compute a conversation score, as will be described in further detail below. The conversation score may also be referred to herein as a "highlight score," "noteworthy score," or "noteworthiness score." The conversation score may reflect, for example, an importance or "noteworthiness" of a conversation based on the comments included as part of the conversation, as received from user/commenter devices 102.

Also, as shown in FIG. 1, server systems 106 may include one or more databases 108. In an embodiment, databases 108 may be any type of data store or recording medium that may be used to store any type of data including, for example, user-generated content (e.g., comments in a conversation) as well as the scoring algorithm used to score such content. In an embodiment, commenting processor 110 may be configured to receive user-generated content from user/commenter devices 102 and store the received content within databases 108. In some implementations, any received data may be stored in the databases 108 in an encrypted form to increase security of the data against unauthorized access.

In a further embodiment, commenting processor 110 may be configured to process the user-generated content using the scoring algorithm and then organize the stored content based on the results of the algorithm. In an example, commenting processor 110 may use the scoring algorithm to compute a score for each conversation identified within a web page or online message board or forum included within the web page. As described above, each conversation may include one or more comments posted or submitted by different users of the message board or forum within the web page, as displayed at each user's device (e.g., each of user/commenter devices 102). The computed score for each conversation may be assigned to the conversation. Commenting processor 110 may then sort the conversations based on the assigned scores. As described above, the score assigned to each conversation may reflect a level of importance or "noteworthiness," which may be determined based on various parameters associated with the conversation or individual participants or users/commenters for the conversation. Accordingly, the conversations may be sorted such that conversations determined to be relatively more important or noteworthy (e.g., have relatively higher conversation scores) are given relatively higher priority, e.g., by being placed relatively higher in a list of conversations identified for a particular web page or message board therein.

Server systems 106 may also include a commenting user interface (UI) module 112 that facilitates receiving user-generated content from users and displaying the received user-generated content. The displayed content may include, for example, user-generated content that has been processed or scored along with the conversation to which it relates, as described above. For example, commenting UI module 112 may be configured to generate, render, and transmit web page content including an article or blog entry and a related message stream of comments posted by users in one or more conversations within the stream. Thus, the web page content may include user-generated content in the form of comments. The comments may include, for example, any one or combination of text, images, and other content (e.g., icons for users to "like" or "pin" their favorite comments, etc.) to user/commenter devices 102 via network 100. Commenting UI module 112 may also be configured to update and transmit revised or updated comment or message stream content including, but not limited to, lists of comments, highlighted or "featured" comments, comments sorted based on a score, etc. Additional features and characteristics of the commenting and scoring functionality of commenting processor 110 will be described in further detail below with respect to the exemplary graphical user interfaces (GUIs) of online conversations and message streams illustrated in FIGS. 4-6.

Figure 2:
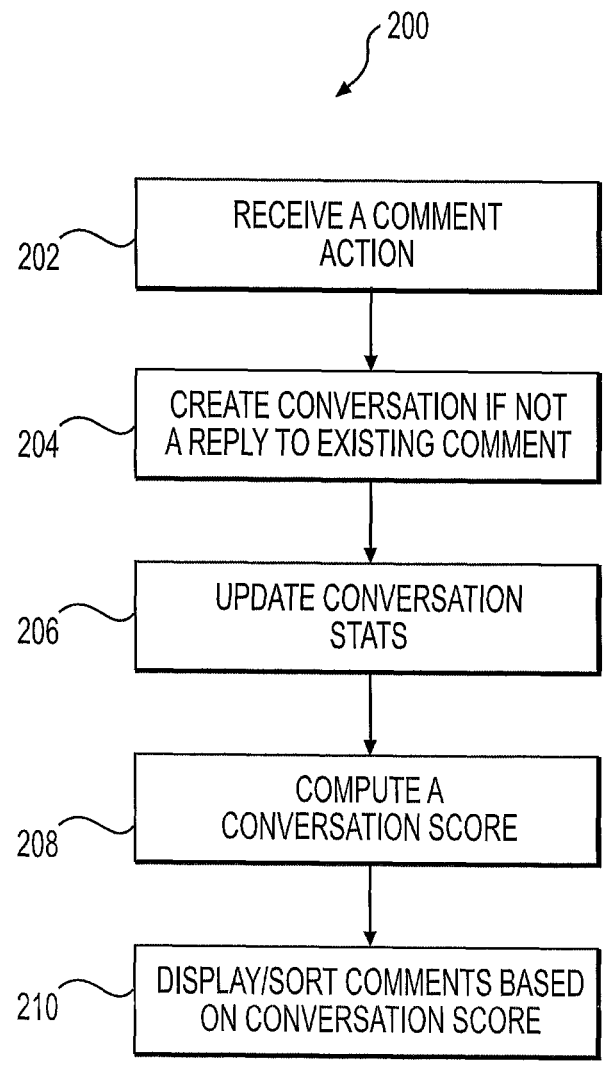
FIG. 2 is a flow diagram of an exemplary method for processing and displaying user-generated content, according to an embodiment of the present disclosure.

FIG. 2 is a flow diagram of a method 200 for processing and displaying user-generated content, according to an embodiment of the present disclosure. The method may involve devising a way to algorithmically compute a conversation or noteworthy score for a closely-related group of comments, e.g., comments associated with a conversation between different users. For example, the score may be a function of a number of factors, which may be represented as a combination of variables for a scoring formula. The score may be updated periodically or as desired by adjusting a value of each variable within the formula. In an embodiment, the score may be updated dynamically in response to detecting or receiving an indication of a new user action with respect to a conversation or a comment within the conversation. Such a new user action may include, for example, the addition of user-generated content (e.g., a new comment) to the conversation. The user-generated content may be received from a user or user device (e.g., any of user/commenter devices 120 of FIG. 1, as described above) via a communication network (e.g., network 100 of FIG. 1, as described above).

As shown in FIG. 2, method 200 may include receiving a comment action (step 202). For example, a comment or any other user-generated content may be received from a user/commenter device 102 over the Internet. Alternatively or additionally, the method 200 may include receiving from one user/commenter device 102 a "like," a "favorite," a "block," or any other action for interacting with or manipulating another user's comment.

Method 200 may also include creating a conversation if the received comment is not in reply to an existing comment (step 204). If the received comment is in reply to a comment within an existing conversation, then method 200 may also include searching one or more existing conversations to identify an existing conversation including the original comment to which the received comment was submitted by the user in reply. The received comment may be appended or otherwise associated or linked to the original comment within the existing conversation that is identified.

Method 200 may then include updating statistics associated with the conversation (step 206). Examples of relevant statistics that may be updated for a conversation include, but are not limited to, the number of comments received (e.g., during a predetermined period of time), the time-of-day when the comments are received, and parameters (e.g., geographic location, noteworthiness or popularity, commenting frequency, etc.) of the users from which comments are received. In an embodiment, each user may be associated with a popularity index or rating. The popularity rating of a user may be based on, for example, the number of other users who may be listed as "fans" or "followers" of the user. Additionally or alternatively, the popularity rating may be based on the number of "likes" or number of times that other users have marked a comment posted by the user as a favorite or otherwise indicated their approval of the user's comments. As will be described in further detail below, other users may indicate themselves to be fans of the user or mark a comment by the user as a favorite by selecting a user interface control element provided via, for example, a GUI for displaying conversations and user-submitted comments associated with an online message board or forum.

Method 200 may then include computing a conversation score for the conversation (step 208). As noted above, the conversation score may alternatively be referred to as a "highlight score" or "noteworthiness score." Computation of the conversation score, highlight score, or noteworthiness score may be performed according to the exemplary algorithms described below.

In one embodiment, a highlight score representing the importance or noteworthiness of a conversation may be calculated based on a number of factors. Such factors may be represented using different variables within one or more formulas corresponding to the exemplary equations provided below. Examples of different factors that may be taken into account in calculating the highlight score may include, but are not limited to, one or more factors in the following list, in which each factor is introduced by an exemplary notation for a variable corresponding to the factor within a scoring formula: favc—total number of times that users have marked at least one comment within a message thread or conversation as a favorite; pfvc—total number of comments/messages within a message thread/conversation marked as a favorite by a user known as an expert or pundit in the particular field or subject matter relating to the conversation or article with which the conversation may be associated; fvcc—number of comments marked as a favorite at least one time; third party ratings—ratings of comments in a thread based on insightfulness or noteworthiness; age—average age of comments in a thread, where the age of each comment may be equivalent to, for example, the time difference (e.g., in seconds) between a root comment's creation time and a reply comment's creation time; size—total number of comments within a thread; and duc (distinct user count)—number of distinct users or participants within a conversation or message thread. As will be described in further detail below, any one or combination of these factors may be incorporated into the calculation of the conversation or highlight score.

In one embodiment, the score may be higher when there are more favorites in the thread (i.e., a higher favorites count or favc). In an example, the distribution to weight this may be considered; the idea for weighting may be to discourage any kind of gaming. For example, any gains beyond fave count of e.g., 100 may be capped, so all comment threads with favs>100 will be treated equal. In one embodiment, the sigmoid curve may be used for sfavc below accounts for gain capping (where a and b will determine the cap).

Additionally or alternatively, the score for a conversation or message thread may be relatively higher based on the following changes to the count or number of one or more of the following factors: an increase in the number of comments marked as favorites within the thread (e.g., a higher fvcc factor); a decrease in the average age of comments (e.g., a relatively short comment creation time difference accounting for a relatively young age factor); an increase in the total number of comments within the thread indicating a relatively high user activity level for the thread (e.g., a higher size factor); and/or an increase in the number of distinct users associated with the thread (e.g., a higher distinct user count or duc factor).

In one embodiment, scoring formulas may be used to calculate scores for each of the above-listed factors and weighting parameters. An example of such a formula that may be used to calculate a score for the favc factor described above is illustrated by equation (1) provided below:

$$S_{favc} = \frac{1}{1 + e^{-\left(\frac{favc + k \times pfvc}{a} - b\right)}} \quad (1)$$

where the variables a and b represent scaling parameters and k represents a weighting parameter that may be used to assign relatively greater weight to the above-described pfvc factor. In an example, the value of the weighting parameter k may be set to assign relatively greater weight to comments submitted by users who may be known as experts or pundits in a particular field (e.g., a field relating to the subject matter of the message thread and article to which it corresponds).

An example a formula that may be used to calculate a score for the fvcc factor described above is illustrated by equation (2) below:

$$S_{fvcc} = \frac{fvcc}{size} \quad (2)$$

where fvcc represents the number of comments in a thread that have been marked as a favorite at least one time and size represents the total number of comments within the thread, as described above.

An example a formula that may be used to calculate a score for the insightfulness factor described above is illustrated by equation (3) below:

$$S_{insightfulness} = \text{insightfulness score} \quad (3)$$

An example a formula that may be used to calculate a score for the age factor described above is illustrated by equation (4) below:

$$S_{age} = \left(\frac{1}{2}\right)^{\frac{age}{half-life}} \quad (4)$$

where half-life represents the amount of time that must elapse before the score is divided in half. In an example, the amount of time may be measured in seconds and the value of the half-life variable may be set to 3600 (e.g., number of seconds in one hour).

An example a formula that may be used to calculate a score for the size factor described above is illustrated by equation (5) below $$S_{size} = \frac{1}{a + e^{-\left(\frac{size}{a} - b\right)}} \quad (5)$$

where the variables a and b represent scaling parameters, as in equation (1) above.

An example a formula that may be used to calculate a score for the distinct user count or duc factor described above is illustrated by equation (6) below:

$$S_{duc} = \frac{1}{1 + e^{-\left(\frac{duc}{a} - b\right)}} \quad (6)$$

where the variables a and b represent scaling parameters, as in equation (1) above.

As illustrated by equations (1)-(6) listed above, the calculated scores for each of the factors (e.g., $S_{favc}$, $S_{insightfulness}$, $S_{fvcc}$, $S_{age}$, $S_{size}$, and $S_{duc}$) may be a normalized value between 0 and 1.

In one embodiment, the complete highlight score may be calculated based on the computed scores for each of the above factors $S_{favc}$, $S_{insightfulness}$, $S_{fvcc}$, $S_{age}$, $S_{size}$, and $S_{duc}$, etc., according to the equation (7) below:

$$S_{highlight} = d \times \frac{(w_{favc} \times S_{favc} + w_{fvcc} \times S_{fvcc} + w_{insightfulness} \times S_{insightfulness})}{3} \quad (7)$$

where $w_{favc}$, $w_{fvcc}$, and $w_{insightfulness}$ are weight factors, the sum of which may be equivalent to a value of one. In an example, these weight factors may be set to an equal weight (e.g., one-third weight for each factor). The variable d represents a decay factor that may be defined by equation (8) below:

$$d = S_{age} \times \frac{(b \times S_{size} + (1-b)S_{duc})}{2} \quad (8)$$

where b is a weight bias factor that is equivalent to $S_{size}$ and $S_{duc}$.

Thus, method 200 may be used to calculate a score for each conversation, which may represent a combined score based on the scores calculated for the individual factors described above. Of course, the calculated conversation score may incorporate any additional number of parameters, such as other known factors about the commenters including, but not limited to, the number of followers, demographics, past commenting history, etc.

Figure 3:
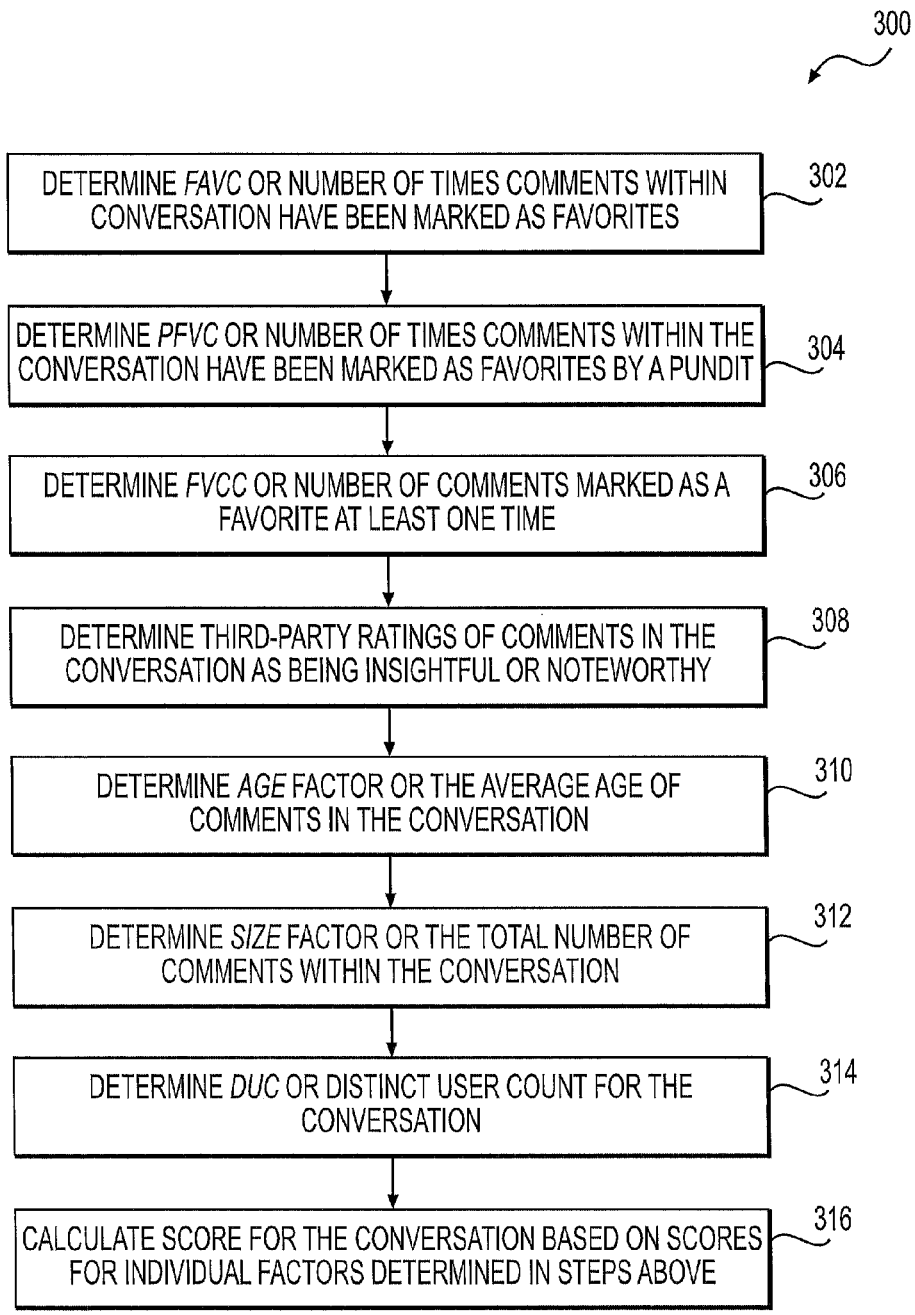
FIG. 3 is a flow diagram of an exemplary method for calculating a score for a conversation based on parameters associated with the conversation or participants of the conversation.

FIG. 3 shows a process flowchart for an exemplary method 300 for computing a conversation score. In an embodiment, step 208 of method 200 may be performed using the steps of method 300. As shown in FIG. 3, method 300 includes determining a value for the favc factor corresponding to the total number of times that comments within the conversation have been marked as favorites (step 302). Then, a value for the pfvc factor corresponding to the total number of comments within the conversation that have been marked as favorites by an expert or pundit is determined (step 304).

In an embodiment, individual or distinct users or commenters associated with a message thread or conversation may be identified based on a unique identifier associated with the user. In an example, the users may be registered account holders or subscribers of the particular web site associated with the message board or forum hosting the conversation. Such users may have gained access to the web site and allowed to post comments to the message board by signing in using login credentials associated with each user's registered account. In a different example, a unique identifier may be generated for new users or users who cannot be identified automatically by the site. In some implementations, such a unique user identifier may be stored in a cookie file associated with the user's web browser. Thus, the web site may be configured to determine the user's identity by searching for the relevant browser cookie and a user identifier that may be stored therein. If such a cookie or identifier is not found, a new identifier may be dynamically generated and stored to the user's device within a new or existing browser cookie for use by the web site going forward.

Method 300 also includes determining a value for the fvcc factor or the number of comments marked as a favorite at least one time (step 306), as described above. Method 300 may also include determining third-party insightfulness ratings of comments in the conversation as being insightful or noteworthy (step 308). Next, a value for the average age of comments within the conversation is determined (step 310). As described above, the age of each comment may be equivalent to, for example, the time difference (e.g., in seconds) between a root comment's creation time and a reply comment's creation time. Additional values that may be determined include values for the size factor corresponding to the total number of comments within the conversation (step 312) as well as the duc (distinct user count) factor corresponding to the number of distinct users or participants within the conversation (step 314). As described above, the values determined for each factor may be used to calculate an individual score for that particular factor, e.g., by using equations (1)-(6) described above. Once the scores for the individual factors have been calculated, a score for the conversation may be calculated based on any one or combination of the individual factor scores (step 316).

Referring back to method 200 of FIG. 2, the calculated score for each conversation may then be used to change how the conversation is displayed, or change how other conversations are displayed relative to that conversation. Specifically, based on the parameter scores and highlight scores calculated above (either according to the above equations or some other suitable and/or equivalent equations), method 200 may then include using the conversation score or highlight score to display one or more noteworthy comments based on a highlight position, highlight indicia, or a sorted order (step 210). For example, a conversation or comment may be moved to the top of a list of comments, moved to the side of the content about which the commenter has commented, moved to be embedded in the content about which the commenter has commented, highlighted, changed in color, or otherwise changed visually to distinguish the comment from other comments.

FIG. 4 illustrates an exemplary GUI for processing and displaying user-generated content, according to an embodiment of the present disclosure. Specifically, FIG. 4 depicts a conversation or thread of comments or messages submitted by different users screenshot of a list of comments in which a "Featured Comments Section" is created to highlight one or more comments by "Community Pundits" (in this case "User1"). Thus, it can be inferred that the featured comment exhibited a conversation score that was calculated according to the above methods as being higher than other comments relevant to the associated content (e.g., article).

FIG. 5 illustrates another exemplary GUI for processing and displaying user-generated content, according to an exemplary embodiment of the present disclosure. Specifically, FIG. 5 depicts a screenshot in which comments are listed and are sortable by "Most Recent," "Highlighted," "Most Faved," and "My Conversations." In this case, the conversations are sorted by "Highlighted," and it can be inferred that the conversations appearing at the top of the list of comments exhibited a conversation (or "noteworthy") score that was calculated according to the above methods as being higher than other comments relevant to the associated content (e.g., article).

Figure 6:
FIG. 6 illustrates yet another exemplary GUI for processing and displaying user-generated content, according to an embodiment of the present disclosure.

FIG. 6 illustrates yet another exemplary GUI for processing and displaying user-generated content, according to an exemplary embodiment of the present disclosure. Specifically, FIG. 6 depicts a view of a web page that can be created based on a particular comment or conversation having a high score. For example, in this case, the comment by "political pundit" "User1" may have exhibited a high score, and that comment and its related comments (i.e., comments on that comment, or comments in that conversation) may be moved to a new web page in which comments are prominently featured relative to the associated content (in this case content on the right side of the web page).

In one embodiment, the user may be presented with hyperlinks or a search bar in which the user may type one or more keywords, or the user may click on or otherwise select a word that appears in the content associated with one or more comments. Doing so may cause only those comments having that keyword in the comment to appear in the comments section of a web page. Alternatively or additionally, comments may be sorted based on how many times the selected keyword appears in those comments. This technique may be incorporated in or used in addition to the above-described noteworthiness algorithm to highlight comments of particular interest to a user or reader of electronic content.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

The examples described above with respect to FIGS. 1-6, or any part(s) or function(s) thereof, may be implemented using hardware, software modules, firmware, tangible computer readable media having instructions stored thereon, or a combination thereof and may be implemented in one or more computer systems or other processing systems.

Figure 7:
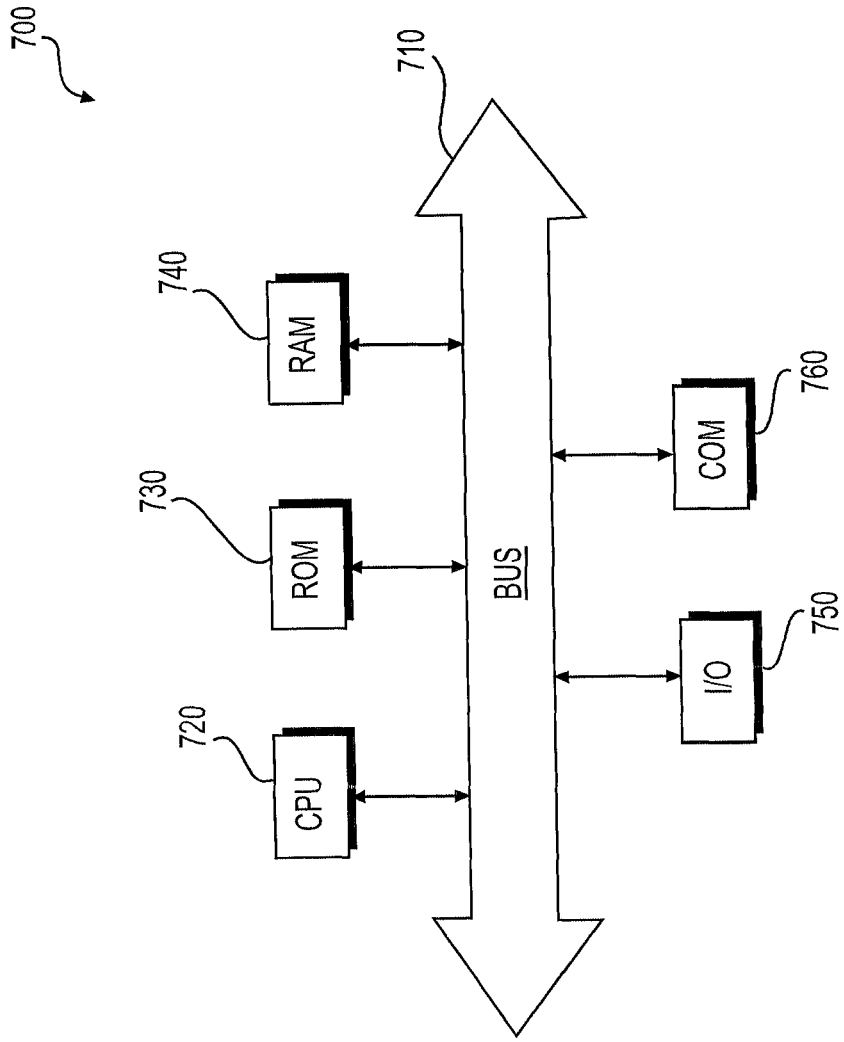
FIG. 7 is a block diagram of an exemplary computer system in which embodiments of the present disclosure may be implemented.

FIG. 7 illustrates a high-level functional block diagram of an exemplary computer system 700, in which embodiments of the present disclosure, or portions thereof, may be implemented, e.g., as computer-readable code. For example, each of the exemplary devices and systems described above with respect to FIGS. 1, 5, and 6 can be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIG. 1, as described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-6 may be implemented using computer system 700. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 7, computer system 700 includes a central processing unit (CPU) 720. CPU 720 may be any type of processor device including, for example, any type of special purpose or a general purpose microprocessor device. As will be appreciated by persons skilled in the relevant art, CPU 720 also may be a single processor in a multi-core/multiprocessor system, such system operating alone, or in a cluster of computing devices operating in a cluster or server farm. CPU 720 is connected to a data communication infrastructure 710, for example, a bus, message queue, network, or multi-core message-passing scheme.

Computer system 700 also includes a main memory 740, for example, random access memory (RAM), and may also include a secondary memory 730. Secondary memory 730, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 730 may include other similar means for allowing computer programs or other instructions to be loaded into computer system 700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 700.

Computer system 700 may also include a communications interface ("COM") 760. Communications interface 760 allows software and data to be transferred between computer system 700 and external devices. Communications interface 760 may include a modem, a network interface (such as an Ethernet card), a communications port, a PCM-CIA slot and card, or the like. Software and data transferred via communications interface 760 may be in the form of signals, which may be electronic, electromagnetic, optical, or other signals capable of being received by communications interface 760. These signals may be provided to communications interface 760 via a communications path of computer system 700, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Computer system 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing and displaying user-generated content, the method comprising:
   receiving, from a user over a network, user-generated-content, the user-generated-content being a user-generated-comment;
   searching one or more conversations to identify an existing conversation relating to the user-generated comment by identifying an existing conversation including an original comment to which the user-generated comment was received from the user in reply;
   determining whether an existing conversation relating to the user-generated comment is identified based on the search;
   when an existing conversation is not identified based on the determination, generating a new conversation for the user-generated comment as the identified conversation;
   when an existing conversation is identified based on the determination, associating the user-generated comment with the identified existing conversation related to the user-generated comment;
   calculating a score associated with the identified conversation; and
   providing the user-generated comment for display in relation to the conversation, based on the calculated score associated with the conversation.

2. The method of claim 1, wherein providing the user-generated comment further comprises displaying the user-generated comment in relation to an associated content item, and the displaying is performed based on the calculated score.

3. The method of claim 2, wherein the associated content item is an online article, online video, or online sound file.

4. The method of claim 2, wherein the user-generated comment is sorted, highlighted, or distinguished based on the calculated score.

5. The method of claim 1, wherein the score associated with the identified conversation is calculated according to the following equation:

$$S_{highlight} = d \times \frac{(w_{favc} \times S_{favc} + w_{fvcc} \times S_{fvcc} + w_{insightfulness} \times S_{insightfulness})}{3}$$

where $w_{favc}$, $w_{fvcc}$, and $w_{insightfulness}$ are weight factors, the sum of which may be equivalent to a value of one, $S_{favc}$ is a score indicating a total number of times that at least one comment within the identified conversation has been marked as a favorite, $S_{fvcc}$ is a score indicating a number of comments within the identified conversation marked as a favorite at least one time, $S_{insightfulness}$ is a score indicating ratings of comments within the identified conversation based on insightfulness or noteworthiness, and d is a decay factor.

6. The method of claim 5, wherein the decay factor d is calculated according to the following equation:

$$d = S_{age} \times \frac{(w \times S_{size} + (1-w)S_{duc}}{2}$$

where $S_{age}$ is a score indicating an average age of comments in within the identified conversation, $S_{size}$ is a score indicating a total number of comments within the identified conversation, $S_{duc}$ is a score indicating a number of distinct users or participants within the identified conversation, and w is a weight bias factor.

7. The method of claim 6, wherein $S_{age}$ is calculated according to the following equation:

$$S_{age} = \left(\frac{1}{2}\right)^{\frac{age}{half-life}}$$

where age is an average age of comments in within the identified conversation and half-life is an amount of time that must elapse before the score associated with the identified conversation is divided in half.

8. The method of claim 7, wherein half-life is measured in seconds.

9. The method of claim 6, wherein $S_{size}$ is calculated according to the following equation:

$$S_{size} = \frac{1}{1 + e^{-\left(\frac{size}{a} - b\right)}}$$

where size is a total number of comments within the identified conversation, and a and b are scaling parameters.

10. The method of claim 6, wherein $S_{duc}$ is calculated according to the following equation:

$$S_{duc} = \frac{1}{1+e^{-\left(\frac{duc}{a}-b\right)}}$$

where duc a number of distinct users or participants within the identified conversation, and a and b are scaling parameters.

11. The method of claim 5, wherein $S_{favc}$ is calculated according to the following equation:

$$S_{favc} = \frac{1}{1+e^{-\left(\frac{favc+k \times pfvc}{a}-b\right)}}$$

where favc is the total number of times that at least one comment within the identified conversation has been marked as a favorite, pfvc is a total number of comments within the identified conversation that have been marked as favorites by an expert or a pundit, a and b are scaling parameters, and k is a weighting parameter.

12. The method of claim 5, wherein $S_{fvcc}$ is calculated according to the following equation:

$$S_{fvcc} = \frac{fvcc}{size}$$

where fvcc is a number of comments within the identified conversation marked as a favorite at least one time and size is a total number of comments within the identified conversation.

13. A system for processing and displaying user-generated content, the system comprising:
a memory having processor-readable instructions stored therein; and
a processor configured to access the memory and execute the processor-readable instructions, which when executed by the processor configures the processor to perform a plurality of functions, including functions to:
receive, from a user over a network, user-generated content, the user-generated content being a user-generated-comment;
search one or more conversations to identify an existing conversation relating to the user-generated comment by identifying an existing conversation including an original comment to which the user-generated comment was received from the user in reply;
determine whether an existing conversation relating to the user-generated comment is identified based on the search;
generate a new conversation for the user-generated comment when an existing conversation is not identified based on the determination;
associate the user-generated comment with the identified existing conversation related to the user-generated comment when an existing conversation is identified based on the determination;
calculate a score associated with the identified conversation; and
provide the user-generated comment for display in relation to the conversation, based on the calculated score associated with the conversation.

14. The system of claim 13, wherein the functions performed by the processor further includes a function to display the user-generated comment in relation to an associated content item, wherein the display function is performed based on the calculated score.

15. The system of claim 14, wherein the associated content item is an online article, online video, or online sound file.

16. The system of claim 14, wherein the user-generated comment is sorted, highlighted, or distinguished based on the calculated score.

17. A computer readable medium storing instructions that, when executed by a computer, cause the computer to perform functions to:
receive, from a user over a network, user-generated content, the user-generated content being a user-generated-comment;
search one or more conversations to identify an existing conversation relating to the user-generated content by identifying an existing conversation including an original comment to which the user-generated comment was received from the user in reply;
determine whether an existing conversation relating to the user-generated comment is identified based on the search;
generate a new conversation for the user-generated comment when an existing conversation is not identified based on the determination;
associate the user-generated comment with the identified existing conversation related to the user-generated content when an existing conversation is identified based on the determination;
calculate a score associated with the identified conversation, based on one or more parameters related to the user or the conversation; and
provide the user-generated comment for display in relation to the conversation, based on the calculated score associated with the conversation.

18. The computer readable medium of claim 17, wherein the computer further performs a function to display the user-generated comment in relation to an associated content item, wherein the display function is performed based on the calculated score, and the displayed user-generated comment is sorted, highlighted, or distinguished based on the calculated score.

19. The computer readable medium of claim 18, wherein the associated content item is an online article, online video, or online sound file.

* * * * *